Jan. 31, 1933.  A. E. SPINDT  1,895,739
COMBINED ORCHARD SPRAYING AND SPRINKLING SYSTEM
Filed Aug. 13, 1930    2 Sheets-Sheet 1
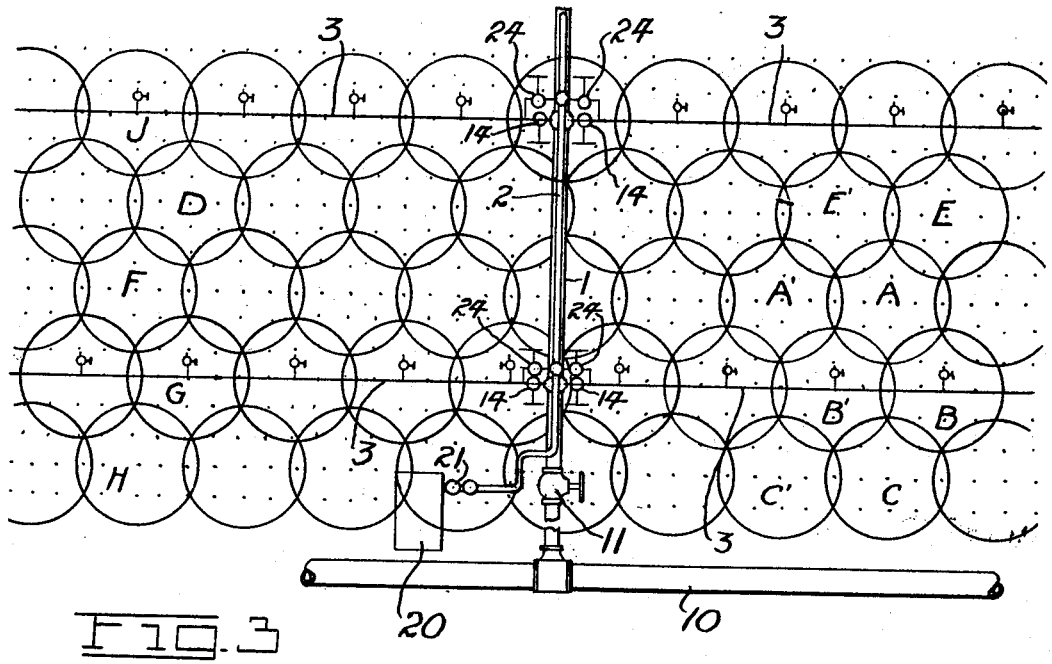
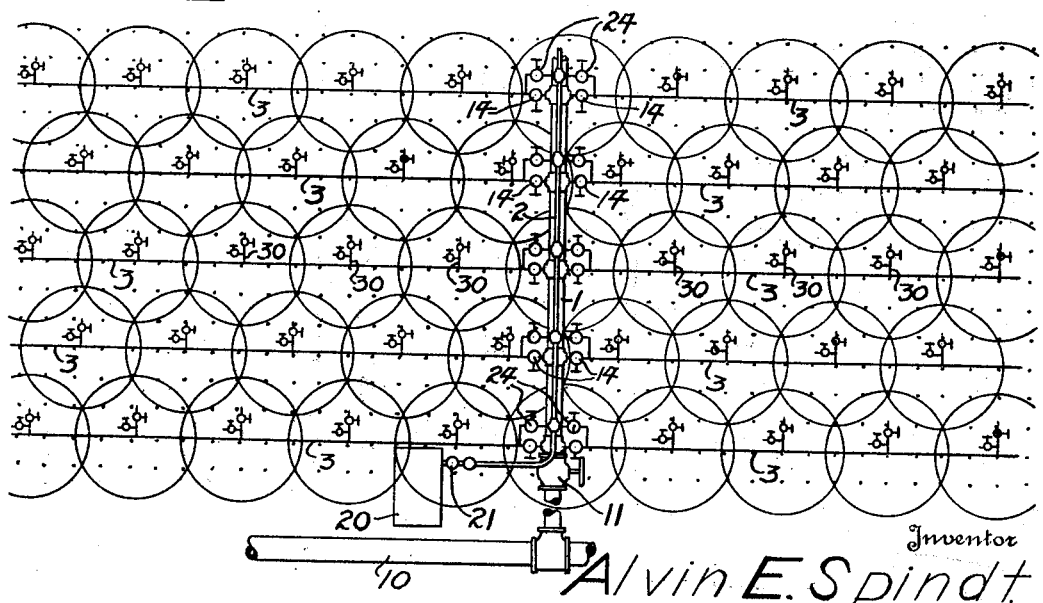
Inventor
Alvin E. Spindt
By Charles L. Reynolds
Attorney

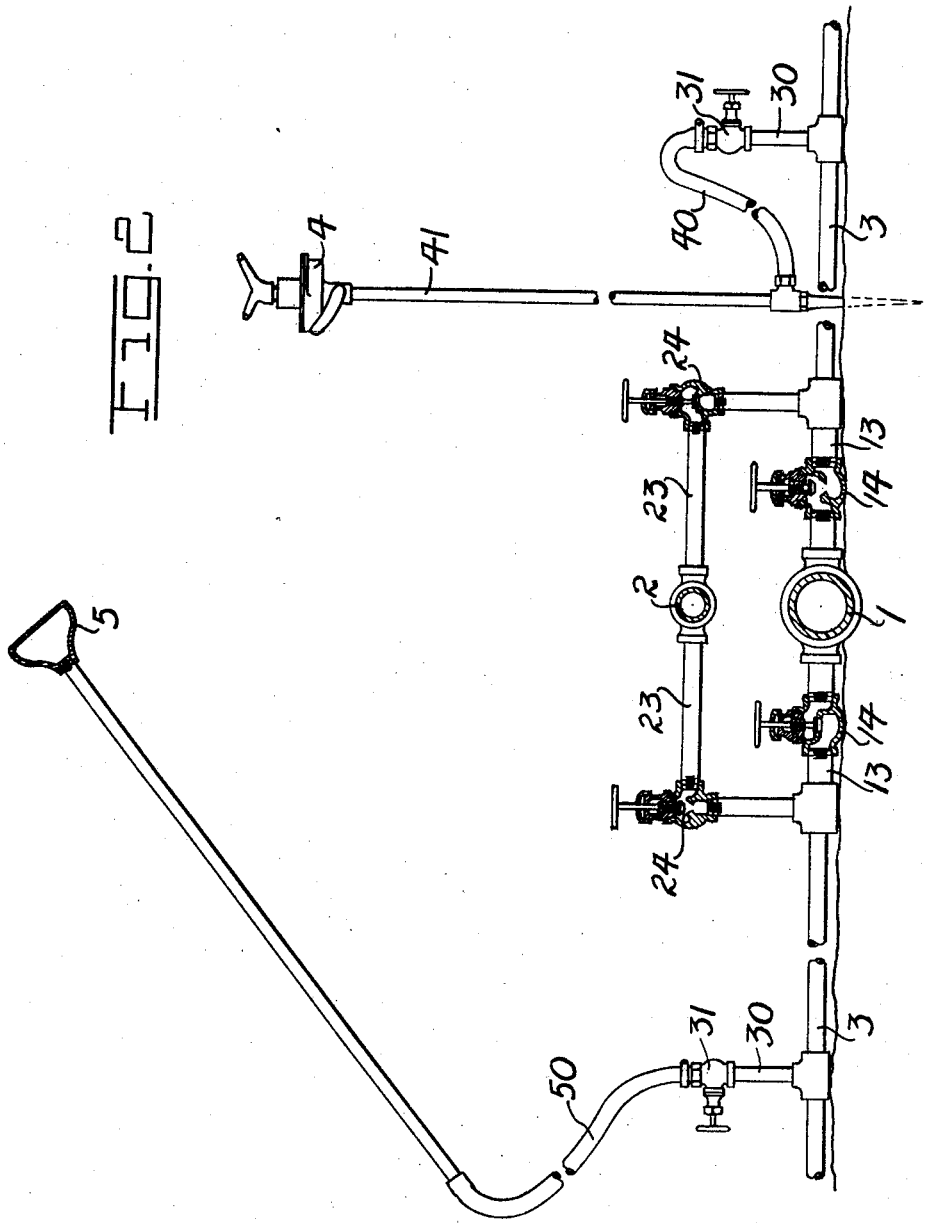

Patented Jan. 31, 1933

1,895,739

UNITED STATES PATENT OFFICE

ALVIN E. SPINDT, OF CHELAN COUNTY, WASHINGTON

COMBINED ORCHARD SPRAYING AND SPRINKLING SYSTEM

Application filed August 13, 1930. Serial No. 474,902.

My invention relates particularly to arrangements for spraying and sprinkling orchards.

It has been customary to irrigate orchards by a series of ditches and furrows in the surface of the ground, carrying water into all parts of the orchard to soak into the ground and thus to irrigate it. This requires extensive preparation of the ground, and a large amount of work in the maintenance of the ditches and furrows in condition, all of which is costly, and as well, it disturbs the cover crop and does not leach the values out of fertilizer spread upon the ground. For these reasons, it has been determined by experiment that orchards can be irrigated by sprinkling more thoroughly, at lower cost, and by the use of less water, an item of considerable moment, since large quantities of fruit are grown for market in arid districts where the cost of water for irrigation is high.

It has been the practice to spray orchards by means of conduits extending throughout the orchard from a stationary spray tank wherein the spray solution is mixed, and from whence it is distributed through these conduits to valved risers, to which spray hoses with nozzles applied may be attached. The spray lines, however, are small, and operate with small volumes at high pressure, for instance, possibly five gallons a minute at a pressure of perhaps five hundred pounds per square inch. On the other hand, sprinkler heads for irrigation must be supplied with large volumes of water at comparatively low pressure, say six hundred gallons an hour at a pressure of perhaps fifty to sixty pounds to the square inch. Because of the necessity of supplying such large volumes, and the fact that such volumes can not be forced through the small sprayer conduit without excessive friction, and then only at pressures too high to be practicable, it has not been practicable to supply water through existing spray systems. Because spray material is supplied at infrequent intervals, and sprinkling must be carried on continuously, it is not practicable to supply the small volume of spray solution through an installation intended for sprinkling, or to interrupt the sprinkling during such times as the orchard is being sprayed. The cost of such installation is a considerable item of expense, and it has not been found economical to duplicate the systems, one for sprinkling and one for spraying. Therefore, notwithstanding the advantages of sprinkler irrigation, it has not been considered economically possible to employ that system, inasmuch as the spray system is an absolute necessity, and can not be dispensed with.

It is the object of my invention, therefore, to provide a combined spraying and sprinkling system, in which the spray material may be supplied in small quantities at the required pressure, in which the water may be supplied in large volumes at low pressure, and in which spraying may be carried on through a part of the water system without appreciable loss of spray material, without appreciably interrupting the sprinkling process, and by means of which sprinkling throughout the rest of the orchard, that is throughout the part not being sprayed at the time, may be carried on uninterruptedly.

My invention comprises the improved system, and the parts and arrangement and disposition thereof as shown in the accompanying drawings, described in this specification, and as will be more particularly defined by the claims which terminate the same.

In the accompanying drawings I have illustrated such a system installed in an orchard, and a typical arrangement for carrying out the same.

Figure 1 represents an orchard plan equipped with my combined spraying and sprinkling system.

Figure 2 is a cross section through the mains, illustrating the connection from one to the other, and the manner of connecting sprinkler heads and spray nozzles in the system.

Figure 3 represents an orchard plan, illustrating a modified combined system.

As a source of water supply, I have indicated a main water pipe at 10, and as a source of spray material I have illustrated the spray tank 20 and the pump 21. It will be understood that water in the pipe 10 will be supplied at a suitable pressure, for instance in the neighborhood of sixty pounds to the square inch, this pressure being developed by gravity, by a pump, or in any way which is found suitable and economical.

Extending from the water pipe 10, past the main cutoff valve 11, is the water main 1, which extends through the orchard. This, insofar as the orchard is concerned, may be taken as the water supply source. Parallel thereto, and extending from the pump 21, is the spray supply main 2, which, so far as the orchard is concerned, may be taken as the spray supply source. The water and spray solution respectively are delivered through these parallel mains 1 and 2, and laterals are provided, as indicated at 3, these extending preferably at each side of the parallel mains 1 and 2, and spaced at intervals therealong. In these laterals are connected risers 30 controlled by valves 31, to which may be connected either the sprinkler head 4 or the spray nozzle 5. The sprinkler hose 40 may be used to connect the sprinkler head 4, upon an upstanding pipe 41, to the lateral 3. A tall pipe 41 supports the sprinkler head 4 at an elevation which will permit it to rise above the trees and to throw water over a circle of a radius of perhaps one hundred feet, and by the employment of a hose the location of the sprinkler head can be changed so that one sprinkler head and one riser 30 can care for a number of trees before it is necessary to disconnect and move to a new location. This obviates the necessity of a large number of laterals, and it is customary to space the laterals perhaps 200 feet apart, as seen in Figure 1. Similarly, the use of a spray hose 50 permits the spray nozzle 5 to be moved about to spray a number of trees before it is necessary to disconnect and move to a different riser.

Connection is established between each of the laterals 3, and the respective mains 1 and 2, by feeders 13 and 23 respectively, each extending from the supply main to a common lateral. Valves 14 and 24 respectively control each of the feeders.

In Figure 1 is represented a general plan of a section of an orchard, the individual spots representing individual trees. The circles represent the area covered by any given sprinkler head set up at the center of such a circle, and the system would be so arranged that by setting up sprinklers in the circles A, B and C, for instance, this part of the orchard would be sprayed for a predetermined length of time, and then the sprinklers would be disconnected and moved to a new set in the center of the circles A', B' and C', for sprinkling these areas. Adjacent circles E and E' could be sprinkled from an adjoining lateral 3 at the same time. If it is desired to spray trees within the circles F, G and H, it is only necessary to close down the water valve 14 leading to this particular lateral, and to open the spray valve 24 connecting thereto, whereupon this lateral is filled with spray material and since it is of small volume, as compared to the main 1, the loss of spray material when this lateral is cleared is not of particular consequence. By reason of its oversize as compared to what would normally be used as a spray lateral, the lateral 3 creates less friction, and causes less loss of pressure. The trees within the circles F, G and H can be sprayed, and sprinkling can be carried on as well in the circles A, B, C, and E, as in the adjoining circles D and J.

In Figure 3 the arrangement is similar to Figure 1, except that each line of sprinkler circles is served by its individual lateral 3, and the sprinkler heads, in such case, can be permanently installed upon the upper ends of the risers 30, instead of being connected thereto by a hose, as in the "portable" system first described. This permits the orchardist to regulate sprinkling merely by opening and closing valves, eliminating the time and labor of moving the hose-supplied sprinklers from one setting to another. The spray heads would in such cases be connected to the risers by valve-controlled branches, the sprinkler heads being cut off from their risers by suitable valves during spraying from that particular lateral.

Such arrangements permit the orchard to be attended to with the minimum of labor (always scarce and undependable), permits an exact record to be kept of the time and date when the various trees were sprayed and sprinkled, and permits sprinkling to go forward without interruption, yet does not waste spray material or involve duplication, except for the parallel mains.

What I claim as my invention is:

1. In a system for sprinkling and spraying orchards, a water supply main and a spray supply main, laterals extending at intervals from said mains, valve-controlled feeders connecting each lateral with each of said mains, take-off means distributed at intervals along the several laterals comprising valve-controlled branched risers, one branch of each riser being adapted to support and supply liquid to a sprinkler head, and another branch being adapted to have coupled thereto a spray hose.

2. In a system for sprinkling and spraying orchards, in combination with a source of continuous supply of water under pressure, and a source of supply of spray solution under comparatively high pressure, a main conduit running from the spray solution source, a second main conduit extending generally parallel to the spray main, and of lighter construction, a plurality of laterals extending outward from the general vicinity of the two mains and means connecting each lateral with each of the two mains, said means including a valve controlling the supply from each main to the lateral.

3. In a system for sprinkling and spraying orchards, in combination with a source of continuous supply of water under pressure, and a source of supply of spray solution under comparatively high pressure, a main conduit running from the spray solution source, a second main conduit extending generally parallel to the spray main, and of lighter construction, a plurality of laterals extending outward from the general vicinity of the two mains, and having each a plurality of valved discharge connections, and means connecting each lateral with each of the two mains, said means including a valve controlling the supply from each main to the lateral.

Signed at Wenatchee, Washington, this 5th day of August, 1930.

ALVIN E. SPINDT.